US006534762B1

(12) United States Patent
Kieselbach et al.

(10) Patent No.: US 6,534,762 B1
(45) Date of Patent: Mar. 18, 2003

(54) METHOD AND DEVICE FOR DETECTING POSITION OF A ROTATING CONTROL MEMBER

(76) Inventors: Jurgen Kieselbach, Am Rotberg 10, D-99848 Wutha-Farnrode (DE); Jens Hannemann, Wartburgallee 7, D-99817 Eisenach (DE)

( * ) Notice: Subject to any disclaimer, the term of this patent is extended or adjusted under 35 U.S.C. 154(b) by 0 days.

(21) Appl. No.: 09/656,266

(22) Filed: Sep. 6, 2000

(30) Foreign Application Priority Data

Sep. 6, 1999 (DE) .......................................... 199 42 323

(51) Int. Cl.[7] ................................................. G01D 5/34
(52) U.S. Cl. ........................... 250/231.13; 250/231.15; 250/231.18; 250/231.14; 250/231.16; 341/13; 341/11
(58) Field of Search ..................... 250/231.13, 231.14, 250/231.18, 231.16, 231.15; 341/13, 11

(56) References Cited

U.S. PATENT DOCUMENTS

| 4,145,608 A | * | 3/1979 | Shirasaki et al. ...... 250/231 SE |
| 4,457,242 A | * | 7/1984 | Nordstrom ............. 112/121.12 |
| 4,952,874 A | | 8/1990 | Stadtfeld ................ 324/207.22 |
| 5,103,225 A | * | 4/1992 | Dolan et al. ................... 341/13 |
| 5,498,870 A | * | 3/1996 | Ishizuka ................. 250/237 G |
| 5,508,088 A | | 4/1996 | Braun ......................... 428/195 |
| 5,557,101 A | * | 9/1996 | Choi ...................... 250/231.13 |
| 5,567,874 A | | 10/1996 | Suzuki et al. .............. 73/118.2 |
| 5,727,111 A | * | 3/1998 | Kume et al. ................. 385/147 |
| 5,923,634 A | * | 7/1999 | Stone, Jr. ..................... 369/112 |
| 5,991,249 A | * | 11/1999 | Lee .......................... 369/44.42 |

FOREIGN PATENT DOCUMENTS

| DE | 34 08 437 C2 | 3/1984 |
| DE | 38 03 853 A1 | 2/1988 |
| DE | 39 26 799 A1 | 8/1989 |
| DE | 40 22 837 A1 | 7/1990 |
| DE | 44 09 892 A1 | 3/1994 |
| DE | 196 01 965 A1 | 1/1996 |
| DE | 198 36 666 C1 | 8/1998 |
| DE | 198 38 731 A1 | 8/1998 |
| DE | 198 55 064 A1 | 11/1998 |
| EP | 0531947 A1 | 3/1993 |
| GB | 2188144 | 9/1987 |
| GB | 2353840 | 3/2001 |

* cited by examiner

*Primary Examiner*—Stephone B. Allen
*Assistant Examiner*—Christoper W. Glass
(74) *Attorney, Agent, or Firm*—Cohen & Grigsby, P.C.

(57) ABSTRACT

An apparatus and method for the multiple detection of optoelectronic signals, especially for detecting the positions of setting elements of flaps, slides, valves, etc. arranged in motor vehicles, to determine the steering angles for controlling driving dynamics, or to determine rotational angles or a linear movement converted into a rotational movement. At least two signal paths extend at an angle relative to one another, with one signal path extending substantially parallel to and under a clock disc and with the second signal path intersecting a sensor element perpendicularly through the clock disc. Signals in the first signal path are deflected by a reflector element underneath the clock disc in the direction towards the sensor element where the coincide with signals in the second signal path.

39 Claims, 3 Drawing Sheets

METHOD AND DEVICE FOR DETECTING POSITION OF A ROTATING CONTROL MEMBER

BACKGROUND OF THE INVENTION

1. Field of the Invention

The invention relates to a method for the multiple detection of optoelectronic signals and a device for carrying out said method. In particular, it relates to a multiple sensor, for example an optoelectronically operating steering angle sensor. Such a sensor is used, for instance, to detect the positions of setting elements of flaps, slides, valves, etc. arranged in motor vehicles and to determine the steering angles for the purpose of controlling driving dynamics or for determining the rotational angles or a linear movement converted into a rotational movement, e.g. in measuring or setting systems.

2. Discussion of the Prior Art

U.S. Pat. No. 5,508,088 discloses a clock ruler or a clock disc for accurately positioning operating machines, handling devices or other setting members. It consists of a transparent material on which there are provided codings that are scanned by optical sensors. On its side facing away from the transmitter, the transparent material is provided with a reflecting layer consisting of a film wherein a light-sensitive layer is applied to one side, and on the same side, a reflecting layer is applied to the light-sensitive layer. The light-sensitive layer is preferably provided, by means of masks or photoplotters, with codings for producing windows of optical sensors.

U.S. Pat. No. 4,952,874 proposes a position recording system with switchable reading units. This system is used for machine tools comprising a tool holder which is rotatable by 360°.

From U.S. Pat. No. 4,145,608, discloses a device for detecting reference positions in the case of rotating machine parts. This device is used, for example, for setting the ignition of internal combustion engines.

U.S. Pat. No. 5,567,874 also proposes a device for detecting rotational angles, for instance in the case of throttle valves. This device is suitable for converting rotational angles into corresponding resistance values.

In the present invention, a clock disc and a sensor element process multiple signals so that additional information (for example information concerning the counting of rounds and recording steering angles) can be processed in a measuring device. In this way, the amount of information that is collected is increased. To approve the collection of information, the track to be scanned is multiply coded by using different wavelength ranges.

Using a single detection device for several sensor units reduces the number of required detection units as compared to the state of the art. A geared coupling is provided so that, in contrast to the state of the art, rotors are arranged side-by-side, not concentrically relative to one another. In this way, the radial installation depth is increased in one portion only. In the remaining portions of the steering angle sensor, only the installation depth predetermined by the first sensor unit is required.

BRIEF DESCRIPTION OF THE DRAWINGS

Below, the invention will be described with reference to several embodiments wherein.

DESCRIPTION OF A PREFERRED EMBODIMENT OF THE INVENTION

Figure 1:
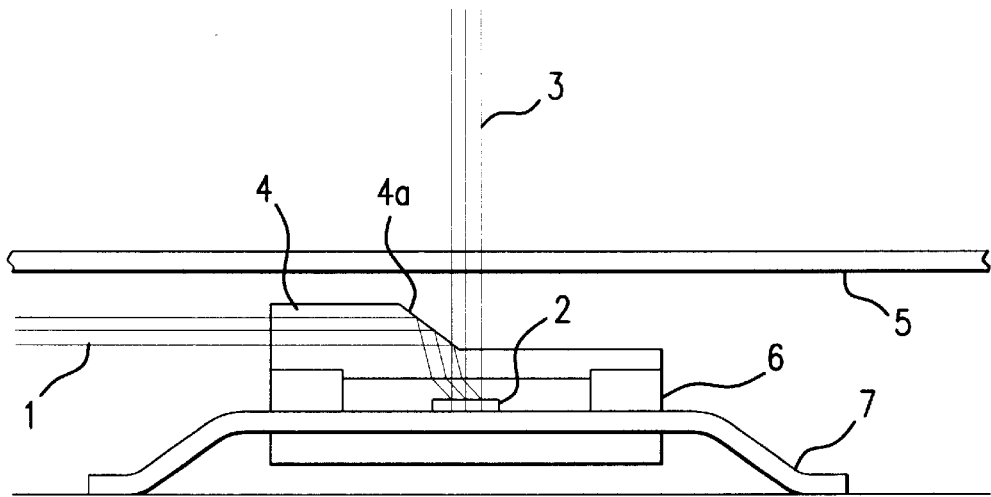
FIG. 1 shows the principle of an inventive measuring device with a prismatic reflector element 4.

In accordance with a method for the multiple detection of optoelectronic signals, especially for detecting the positions of setting elements of flaps, slides, valves, etc arranged in motor vehicles for the purpose of determining the steering angles for controlling driving dynamics, or for determining rotational angles or a linear movement converted into a rotational movement, at least two signal paths are provided which signal paths define at an angle there between. A first signal path 1 extends substantially parallel to and underneath a clock disc 5 and a second signal path 3 intersects a sensor element 2 perpendicularly through the clock disc 5. Signals in the first signal path 1 are deflected by a reflector element 4 underneath the clock disc 5 in the direction towards the sensor element 2 such that they coincide with the second signal path 3.

In a preferred embodiment, at least two signal paths are provided. The two signal paths extend at a right angle relative to one another. The first signal path 1 extends substantially parallel to and underneath the clock disc 5 and the second signal path 3 hits the sensor element 2 through the clock disc 5.

The signal path 1 can also be coupled laterally into the sensor element 2 by a prismatic reflector element 4 and, preferably, an auxiliary reflector element 4a deflecting the light path 1 in the direction towards a partially mirror-plated clock disc 5 is inserted into the signal path 1, with the reflection point 9 on the clock disc 5 being arranged in such a way that the light path 1, via the reflector element 4, coincides with the light path 3 in the sensor element 2. To the extent that the clock disc 5 is mirror-plated to accommodate selected wavelengths, the wavelength range of the light entering sideways can deviate from the wavelength range of the light path entering perpendicularly.

If the signal path 3 is changed by the position of the transmitter disc, the angle of rotation can be detected over one round. Because the signal path 1 is changed as a result of the position of the gearing, it is possible to record the number of rotations over one round.

A device for carrying out the inventive method comprises a first sensor unit 32 consisting of a rotor 34 carrying a first coding and coupled to a rotational movement and of a detection device arranged at the stator end for scanning the coding of the rotor 34 within one segment of the entire rotational range of the steering wheel. Furthermore, the device comprises a second sensor unit 33 consisting of a rotor 22 coupled, via a gearing, to the rotor 34 of the first sensor unit 32, and of a coding 11 movable by the rotor 22 and of a detection device 38 arranged at the stator end for scanning said coding 11 within the entire range of rotation. It is proposed that the detection device 38 of the first sensor unit 32 is constituted by a plurality of adjoining converter elements in the form of a sensor array and that said sensor array 38 is arranged for scanning the coding 36 of the rotor 34 of the first sensor unit 32 and for scanning the coding 11 of the first sensor unit 33 in that the transmitter of the first sensor unit 32 is provided in the form of a code disc 34 and in that the sensor array 38, in respect of its length, is arranged so as to point transversely to the direction of movement of the coding 36 of the code disc 34 and, in respect of its converter elements, is arranged so as to point to the flat end of the code disc 34 carrying the coding 36, and that above the sensor array 38, there is arranged an optical member 13, with the ray of light in the form of the coding being laterally coupled into said optical member and being reflected towards the photo-sensitive surface of the sensor array 28, and that the coding of the second sensor unit 33 is put into effect by a diaphragm 10 which is movable relative to a fixed light source.

For coupling, via a gearing, the rotor 22 of the second sensor unit 33 to the transmitter 34 of the first sensor unit 32, there is provided a differential planetary gear 16 which comprises an input gear 19 designed as a change-over gear and engaging with the transmitter 34 of the first sensor unit 32 and which, next to the input gear 19, comprises an internally toothed, annular reference gear 26 fixed to the frame, wherein between a pinion 24 positioned on the axis 21 of the input gear 19 and the inner toothing of the reference gear 26, there is arranged a planetary gear 25 which engages both the inner toothing of the reference gear 26 and the rotor 22 of the second sensor unit 33, in which rotor 22 is designed as the output gear 22 of the gearing 16 and comprises a different number of teeth as compared to the reference gear 26, and wherein the rotor 22, by means of a pivot lever 17, engages a claw of an arm 27 which carries the coding of the second sensor unit 33 and which is pivotally supported between the code disc 34 designed as a transmitter and the sensor array 38.

The inventive multiple detection system for optoelectronic signals substantially consists in that
 a) there are formed two signal paths which are introduced substantially perpendicularly relative to one another into the optoelectronic measuring device;
 b) wherein one ray path (3) is directed perpendicularly relative to the clock disc and to a reflector element (4);
 c) wherein a second ray path (1) extends parallel to and underneath the clock disc (5) and is deflected by a reflector element (4) to the sensor element (2);
alternatively,
 d) the ray path (1) is directed by an auxiliary reflector element (4a) initially to the underside of the clock disc (5) and then by the reflector element (4) to the sensor element (2).

The above-described procedure is advantageous in that additional information, for example on counting rounds for the purpose of detecting steering angles, can be processed in a measuring device. Partial mirror-plating or mirror-plating to accommodate selected wavelengths permits an increase in the amount of information that can be collected. The use of different wavelength ranges allows multiple coding of the track to be scanned for the purpose of collecting information, or scanning for the purpose of collecting information through the one ray of light and simultaneous reflection of a second ray of light whose wavelength differs from that of the first ray of light.

FIG. 1 shows a horizontal ray path 1 and a vertical ray path 3 which are generated either by different light sources or by a common light source by splitting the light path.

The horizontal light path 1 extends underneath the clock disc 5 which permits the detection of steering angles for example. The signal arriving via the ray path, e.g. a ray of light, hits the reflector element 4 comprising a step 4a of the type of a prism face. In this case, there occurs a total reflection of the laterally arriving ray-of light towards the sensor element 2.

Furthermore, FIG. 1 shows a holding element 6 for the reflector element 4, a holding bracket 7 for the holding element 6 and a base plate 8 on which the above-described elements are secured.

Figure 2:
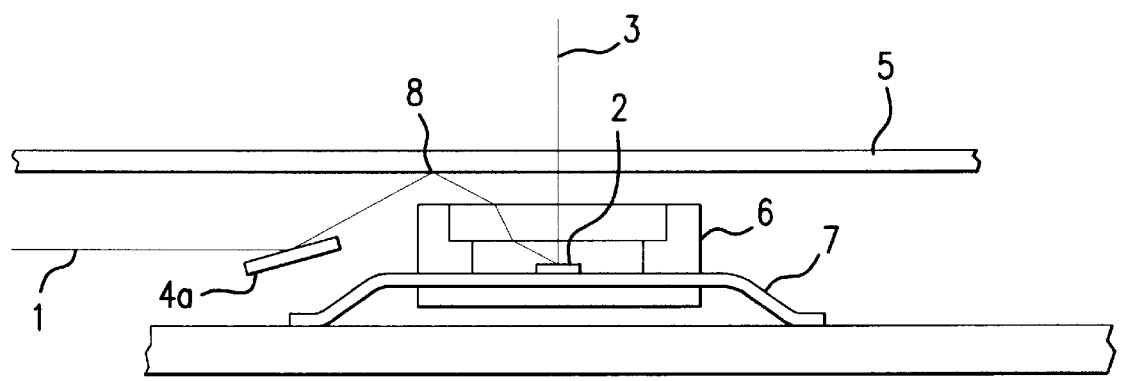
FIG. 2 shows the inventive measuring device with a partially mirror-plated clock disc 5 or with a selectively mirror-plated clock disc 5.

In contrast to FIG. 1, there is shown in FIG. 2 an auxiliary reflector element 4a which is positioned in the ray path 1 and which ensures deflection of the ray path 1 towards the underside of the clock disc 5. In the point of impact 8 of the deflected ray path 1, there occurs a further deflection of the ray path 1 towards the reflector element 4 which, in the variant according to FIG. 2, is formed by a symmetric member, for example by a plate of glass. After multiple deflection, the signal, via the ray path 1, hits the sensor element 2 where it coincides with a signal of the vertical ray path 3.

This variant according to FIG. 1 is advantageous in that the reflector element 4 can be designed so as to be relatively simple and is therefore cost-effective to produce.

Figure 3:
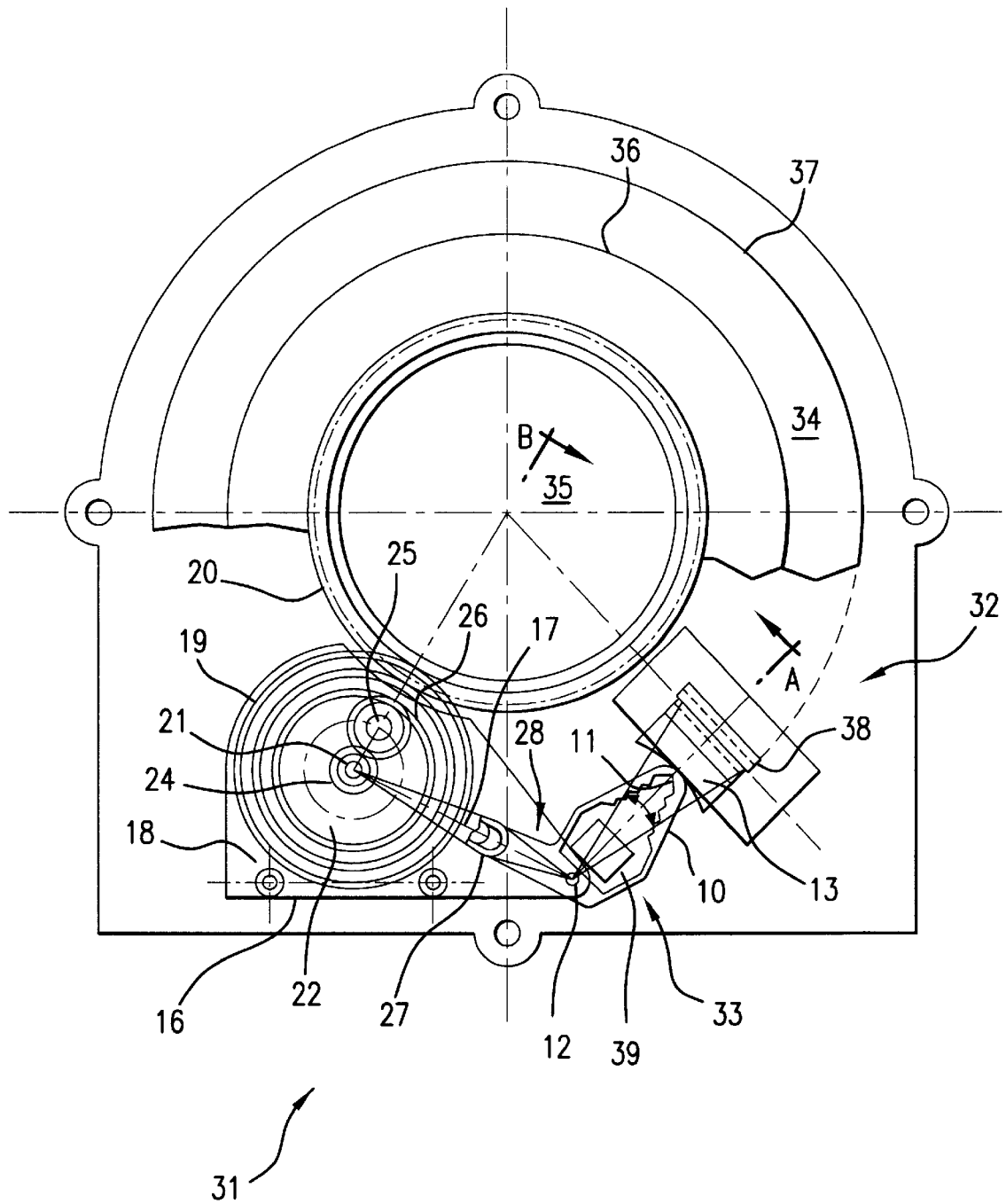
FIGS. 3 and 4 show an application example of a measuring device in accordance with the invention.
Figure 4:
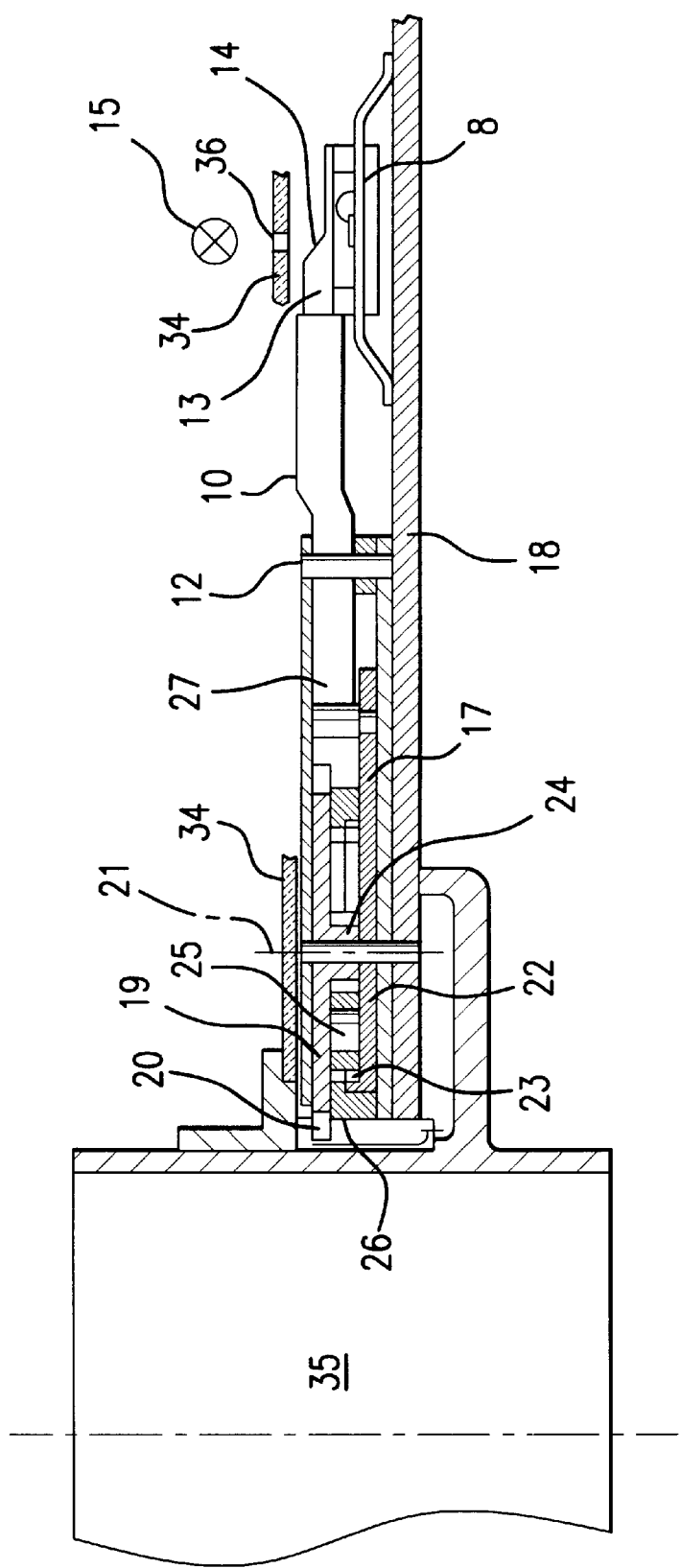

In FIGS. 3 and 4, a steering angle sensor unit is shown by way of example for the inventive method.

The steering angle or steering lock angle of motor vehicles is required for supplying, for example, a driving dynamics control system with said value. In addition to said steering angle values, such a driving dynamics control system contains further measured values, for example the wheel speed or the rotation of the vehicle around its normal axis. On the one hand, it is necessary to determine the absolute steering lock angle and on the other hand, the steering speed, so that these values can be evaluated together with the remaining detected values by the driving dynamics control system and converted for the purpose of controlling actuators, for instance of the brakes and/or of the engine management system.

The device in accordance with the invention comprises two sensor units, with the different codings of the sensor units loading a common detection device. For this purpose, the detection device of the first sensor unit is constituted by a plurality of adjoining converter elements in the form of a one-dimensional or even two-dimensional sensor array. The two sensor units preferably operate optoelectronically, with the coding of the first sensor unit being formed by a code disc illuminated on one side and with the sensor array provided in the form of a line sensor for instance, with its photo-sensitive surface pointing to the code disc, being arranged on the side of the code disc arranged opposite the light source.

The transmitter carrying the coding of the first sensor unit can be provided in the form of a rotor coupled directly to the rotational movement of the steering spindle, for instance a circular code disc or a transmitter element moved translatorily relative to the rotational movement. In the latter case, the transmitter element is coupled by a geared coupling, for example by a threaded drive, to the rotational movement of the steering spindle. If the transmitter is provided in the form of a code disc, its coding can consist of an Archimedean spiral designed as a light slot, and to increase the measuring accuracy, said code track is preferably associated with a circular reference track which is arranged centrically relative to the code track and which, like the code track, is formed by a light slot or it can be the circumferential edge of the code disc. Instead of using light slots, the tracks, i.e. the code track and the reference track, can also be provided in the form of blackened lines as compared to an otherwise transparent code disc.

In a reduction gear, the rotor of the second sensor unit is coupled to the transmitter of the first sensor unit, which transmitter is coupled to the movement of the steering wheel. The rotor of the second sensor unit comprises a pivot lever which engages a claw of an arm which carries the coding of the second sensor unit and is pivotably supported between the code disc provided in the form of a transmitter and the sensor array. A movement of the driven rotor then results in a pivot movement of the arm whose coding, in accordance with the angular position of the steering wheel within the entire rotational range of the steering wheel, loads different regions of the sensor array.

In a reduction gear, the rotor of the second sensor unit is coupled to the transmitter of the first sensor unit, which transmitter is coupled to the movement of the steering wheel. The rotor of the second sensor unit comprises a pivot lever which engages a claw of an arm which carries the coding of the second sensor unit and is pivotably supported between the code disc provided in the form of a transmitter and the sensor array. A movement of the driven rotor then results in a pivot movement of the arm whose coding, in accordance with the angular position of the steering wheel within the entire rotational range of the steering wheel, loads different regions of the sensor array. The maximum amount of movement of the arm of the second sensor unit can correspond to the maximum length of the line sensor, for instance. This is the reason why the driven rotor can move by a small amount only. The gearing reduction between the transmitter of the first sensor unit and the rotor of the second sensor unit has to be correspondingly large. Therefore, there is inserted a differential planetary gear which comprises an input gear provided in the form of a change-over gear and engaging the transmitter of the first sensor unit formed by a rotor for example. The reference gear is annular in shape, internally toothed and arranged at the frame end. On the hub of the input gear, there is arranged a pinion which, via a planetary gear positioned between the pinion and the reference gear, is coupled to the movement of the input gear. The rotor of the second sensor unit constitutes the output gear of this gearing assembly and is driven by the planetary gear, with the number of teeth of the driven rotor being different from the number of teeth of the reference gear. When designing such a planetary gear, it is preferable, for reasons of space, to insert the input and output gears into one another, with the internally toothed reference gear being arranged, so as to be fixed, concentrically to, and inside the input gear and with the internal toothing of the reference gear embracing the driven rotor.

The result of using only one single detection device for the two sensor units is that, as compared to the state of the art, the number of required detection devices is reduced. The result of arranging the geared coupling in the way as described, wherein, in contrast to the state of the art, the two rotors are not arranged concentrically relative to one another, but side by side, is that in the radial direction relative to the rotational axis of the first sensor unit, only in one region, i.e. the region in which the planetary gear is arranged, there is required an installation depth which is increased in size relative to the radial installation depth of the first sensor unit. In the remaining portions of the steering angle sensors, only the installation depth predetermined by the first sensor unit is required.

Further embodiments of the invention form the subject of further sub-claims and will be described below with reference to the attached drawing wherein FIG. 3 is a diagrammatic plan view of a steering angle sensor.

FIG. 4 is a section along line A-B through the steering angle sensor according to FIG. 3.

An optoelectronically operating steering angle sensor 31 comprises two sensor units 32, 33. The sensor unit 31 consists of a code disc 34 which is provided in the form of a rotary transmitter of the first sensor unit and which is connected in a rotationally fast way to the steering spindle 35 of a motor vehicle. The coding carried by the code disc 34 is a code track 36 in the form of a light slot which constitutes an Archimedean spiral and which, in the Figure, appears as a black line. The reference track is the outer edge 37 of the code disc 34. The sensor unit 32 is associated with a line sensor 38 with a plurality of optoelectronic converter elements. The line sensor 38 is aligned radially relative to the rotational axis of the steering spindle. The photosensitive surface of the line sensor 38 points towards the underside of the code disc 34. The length of the line sensor 38 or of the converter elements respectively extends over the region which is covered by code track 36 in the radial direction and projects beyond the outer edge 37 of the code disc 34, so that the outer edge 37 appearing in the line sensor 38 can be used as a reference track. The line sensor 38 is provided with an illuminating device which is arranged opposite relative to the code disc 34, which, in FIG. 4, has been given the reference number 15 and which illuminates the code disc 34 from above.

The sensor unit 33 comprises a light source 39 arranged in a diaphragm 10. The diaphragm 10, on its front, comprises a diaphragm opening 11 allowing a ray of light to emerge from the diaphragm 10. As indicated by the double arrow, the diaphragm 10 is pivotable around a pivot axis 12, so that the ray of light emerging from the diaphragm opening 11, as a function of the position of the diaphragm 10, is able to load different converter elements of the line sensor 38. For deflecting the rays of light emerging from the diaphragm opening 11 in a plane extending parallel to the plane of the code disc 34 into the plane for loading the line sensor 38, an optical member 13 is arranged above the line sensor 38, which optical member 13 comprises a reflection face 14 serving to deflect the coupled ray of light. The copy of the code track 36 of the first sensor unit 32 and of the ray of light of the second sensor unit 33 emerging from the diaphragm opening 11 load the same sector of the line sensor 38.

The arrangement of the two sensor units 32, 33 can also be taken from the sectional illustration of FIG. 4 which also contains a diagrammatic illustration of the light source 15 arranged above the code disc 34.

The sensor unit 32 serves to detect the angular position of the steering wheel or of the steering spindle 35 within a segment of 360° of an assumed total rotational range of the steering wheel of four rotations (1440°). The sensor unit 33 serves to record the position of the steering spindle 35 within the total rotational range of the steering wheel of 1440°. Therefore, the movement of the diaphragm 10 has been calculated to be such that, when passing through the 1440° range, the ray of light constituting the coding of said sensor unit 33 and emerging from the diaphragm opening 11 moves across the entire photosensitive surface of the line sensor 38.

The movement of the diaphragm 10 is coupled via a gearing 16 and a pivot arm 17 to the rotational movement of the code disc 34 and of the steering spindle 35, respectively. The gearing 16 is a differential planetary gear 16 whose components are arranged on a plate 18 of a frame. The planetary gear 16 consists of an input gear 19 which engages a toothed wheel 20 connected in a rotationally fast way to the steering spindle 35. On the axis 21 of the input gear 19 there is supported an output gear 22 which forms the rotor of the second sensor unit 33, provided in the form of a hollow gear and comprises an inner toothing 23. Between the inner toothing 23 and a pinion 24 also supported on the axis 21 between the input gear 19 and the output gear 22, there is arranged a planetary gear 25. Furthermore, the gearing 16 is associated with an internally toothed, annular reference gear 26 which is arranged next to the input gear 19 and which is fixedly arranged at the frame. The planetary gear 25 engages both the inner toothing of the reference gear 26 and the inner toothing 23 of the output gear 22. However, the number of teeth of the reference gear 26 has been changed relative to the number of teeth of the output gear 22.

When the input gear 19 moves, the rotational movement is transferred via the pinion 24 and the planetary gear 25 to the output gear 22 at whose outer circumference, there is arranged the pivot arm 17. The simultaneous movement of the planetary gear 25 in the inner toothing of the reference gear 26 and in the inner toothing of the output gear 22—because of the different numbers of teeth of said gears—causes or generates a pivot movement of the output gear 22, so that said movement results in a pivot movement of the arm 17. By means of its free end, the pivot arm 17 is inserted into a claw 27 which forms part of a two-arm lever 28 whose lever axis is the pivot axis 12, with the diaphragm 10 forming the further arm of the lever 28. A rotary movement of the output gear 22 serving as the rotor of the second sensor unit then results in the above-described pivot movement of the diaphragm 10.

For the purpose of reducing any gearing play, the pivot arm 17 can operate against a spring element.

The selective detection of the coding 36 of the sensor unit 32 and of the coding 11 of the sensor unit 33 with the help of code tracks can be achieved in different ways. For example, the one and the other code track can be detected alternately. Furthermore, to be able to differentiate between the two codings 36, 11, the line sensor can be illuminated with a coded light, with differentiation taking place as a function of wavelength, brightness or polarisation. In addition to said physical separation of the code tracks, said differentiation between the two code tracks can also be effected algorithmically. Such a separation can be achieved for example by a redundant information code, so that even if the line sensor 38 is simultaneously illuminated with both code tracks 36, 11, clear data can be provided on the position of the respective code tracks 36, 11 and thus on the angular position of the steering wheel.

What is claimed is:

1. A method for detecting the position of a control member that is coupled to a clock disc, said clock disc defining first and second faces that are oppositely disposed with respect to each other, said clock disc also defining a gap between said first and second faces, said method comprising the steps of:
   a) transmitting a first optoelectronic signal that corresponds to the position of the control member, said first optoelectronic signal being transmitted along a first signal pathway to a sensor element that is located adjacent to the first face of the clock disc, said first signal pathway being located on the same side of said clock disc as said sensor and including a reflective element that deflects the first optoelectronic signal;
   b) transmitting a second optoelectronic signal that corresponds to the position of the control member, said second optoelectronic signal being transmitted along a second signal pathway to said sensor element, said second signal pathway being oriented at an angle with respect to said first signal pathway, said second signal pathway extending through said gap in said clock disc and coinciding with the first signal pathway at the sensor element; and
   c) illuminating the sensor element with the first optoelectronic signal at times when said sensor element is also illuminated by said second optoelectric signal to detect the position of the control member.

2. The method according to claim 1 wherein at least a portion of said first signal pathway is substantially parallel to the first face of the clock disc, and wherein said second signal pathway is substantially perpendicular to the second face of said clock disc.

3. The method according to claim 1 wherein said reflective element is on the same side of said clock disc as said sensor and wherein said reflective element comprises a prismatic reflector element.

4. The method according to claim 1 wherein said reflective element comprises a reflector element that deflects signals travelling in the first signal pathway toward the first face of said clock disc, and wherein said reflective element further comprises a mirror-layer that is secured to at least a portion of the first face of the clock disc such that signals that are deflected toward the first face of the clock disc by said reflector illuminate said mirror-layer and said mirror-layer redirects signals travelling in the first signal pathway toward said sensor.

5. The method according to claim 4 wherein the mirror-layer of said clock disc selectively redirects light within a given range of wavelengths, and wherein the range of wavelengths of light signals travelling in the first signal pathway are different from the range of wavelengths of light signals travelling in the second signal pathway.

6. The method according to the steps of claim 1 wherein the location of the second signal pathway varies in response to the angular position of the clock disc and wherein the location of the first signal pathway varies in response to the total angular displacement of the clock disc with respect to a reference position.

7. The method according to the steps of claim 6 wherein the location of the second signal pathway varies radially with respect to said clock disc in accordance with the angular position of said clock disc.

8. The method according to the steps of claim 6 wherein the location of the first signal pathway adjacent to said sensor varies radially with respect to said clock disc in accordance with the total angular displacement of said clock disc with respect to a reference position.

9. The method according to the steps of claim 8 wherein the total angular displacement of said clock disc with respect to a reference position corresponds to he position of the control member within a first range of motion.

10. The method according to the steps of claim 9 wherein the angular position of said clock disc corresponds to the position of the control member within a second range of motion.

11. The method according to the steps of claim 9 wherein the second range of motion of the control member that corresponds to the angular position of the clock disc is included within the first range of motion that corresponds to the total angular displacement of the clock disc with respect to a reference position.

12. The method of claim 11 wherein the second range of motion corresponds to the angular position within one revolution of the control member and wherein the first range of motion corresponds to the number of revolutions of the control member with respect to a reference position.

13. Apparatus for detecting the position of a control member, said apparatus comprising:
   a) a first sensor unit, said first sensor unit having a first rotor that includes a first coding means that provides a first optoelectronic signal, said first rotor being connected to the control member and having first and second oppositely disposed sides, said first rotor being responsive to the movement of the control member;

b) a second sensor unit that is located adjacent to said first side of said first rotor, said second sensor unit having:
 i.) a second rotor;
 ii.) a gear set that couples the second rotor to the first rotor of said first sensor unit; and
 iii.) a second coding means that provides a second optoelectronic signal, said second coding means being connected to the second rotor and also being responsive to the angular movement of said second rotor; and c) a detection device that includes a sensor array that is located adjacent said first side of said first rotor, said sensor array being illuminated by the first optoelectronic signal of said first coding means to detect the position of the control member within a limited range of motion of the control member, said sensor array also simultaneously being illuminated by the second optoelectronic signal of said second coding means to detect the position of the control member within the entire rang of motion of the control member.

14. The apparatus of claim 13 wherein the first coding means comprises a code disc that codes the angular position of the control member according to the position of a light signal within a linear range of movement.

15. The apparatus of claim 14 wherein the sensor array of the detection device is oriented transversely with respect to the linear range of movement of the light signal of said code disc.

16. The apparatus of claim 15 wherein the sensor array of the detection device comprises a plurality of converter elements that are arranged in a linear array.

17. The apparatus of claim 16 wherein the respective converter elements of the sensor array are oriented substantially orthogonally with respect to the code disc.

18. The apparatus of claim 13 wherein the detection device further includes an optical member that is positioned between the sensor array and the first coding means, said optical member receiving the first optoelectronic signal from the first coding means and also receiving the second optoelectronic signal from the second coding means, said optical member reflecting the first optoelectronic signal from the first coding means and the second optoelectronic signal from the second coding means to the sensor array.

19. The apparatus of claim 18 wherein the sensor array comprises a plurality of converter elements that are arranged in a linear array and wherein each of said converter elements has a photo-sensitive surface.

20. The apparatus of claim 19 wherein the optical member reflects both the first optoelectronic signal from the first coding means and the second optoelectronic signal from the second coding means toward the photo-sensitive surface of the converter elements of the linear array.

21. The apparatus of claim 13 wherein said second rotor comprises an output gear, said output gear including a pivot lever that engages the second coding means.

22. The apparatus of claim 21 wherein the second coding means comprises an arm that has a claw at one end thereof, said claw engaging the pivot lever of the output gear, said arm being pivotally mounted adjacent to the first rotor of the first sensor unit and adjacent to the detection device.

23. Apparatus for detecting multiple optoelectronic signals that correspond to the position of control members, said apparatus comprising:

a) a first sensor unit, said first sensor unit having a first rotor that includes a first coding means, said rotor being connected to the control member and responsive to the angular movement of the control member;

b) a second sensor unit, said second sensor unit having:
 i.) a second rotor;
 ii.) a gear set that couples the second rotor to the first rotor of said first sensor unit;
 iii.) a second coding means that includes a diaphragm that has an opening therein, said second coding means being connected to the second rotor and responsive to the angular movement of said second rotor; and c) a detection device that includes a sensor array that is responsive to the first coding means to detect the position of the control member within a given revolution of the control member, the opening of said diaphragm being moveable with respect to the sensor array to detect the position of the control member within the entire range of motion of the control member.

24. The apparatus of claim 23 wherein the first coding means comprises a code disc that codes the angular position of the control member according to the position of a light signal within a linear range of movement.

25. The apparatus of claim 24 wherein the sensor array of the detection device is oriented transversely with respect to the linear range of movement of the light signal of said code disc.

26. The apparatus of claim 25 wherein the sensor array of the detection device comprises a plurality of converter elements that are arranged in a linear array.

27. The apparatus of claim 26 wherein the respective converter elements of the sensor array are oriented substantially orthogonally with respect to the code disc.

28. The apparatus of claim 23 wherein the detection device further includes an optical member that is positioned between the sensor array and the first coding means, said optical member receiving coding signals from the first coding means and also receiving signals from the second coding means, said optical member reflecting coding signals from the first coding means and from the second coding means to the sensor array.

29. The apparatus of claim 28 wherein the sensor array comprises a plurality of converter elements that are arranged in a linear array and wherein each of said converter elements has a photo-sensitive surface.

30. The apparatus of claim 29 wherein the optical member reflects coding signals from the first coding means and from the second coding means toward the photo-sensitive surface of the converter elements of the linear array.

31. Apparatus for detecting multiple optoelectronic signals that correspond to the position of control members, said apparatus comprising:

a) a first sensor unit, said first sensor unit having a first rotor that includes a first coding means, said rotor being connected to the control member and responsive to the angular movement of the control member;

b) a second sensor unit, said second sensor unit having:
 i.) an output gear that includes a pivot lever;
 ii.) a differential planetary gear that couples the output gear to the first rotor of said first sensor unit, said differential planetary gear including;
  an input gear that engages the first rotor of the first sensor unit;
  an annular reference gear that has internal teeth and that is located axially adjacent to the input gear, said reference gear being secured to a reference position and having a different number of teeth than the output gear;

a pinion that engages the inner teeth of the reference gear and that is located along the axis of rotation of the input gear; and a planetary gear that engages the inner teeth of the reference gear;

iii.) a second coding means, said second coding means being engaged with the pivot lever of said output gear and responsive to the angular movement of said output gear; and c) a detection device that includes a sensor array that is responsive to the first coding means to detect the position of the control member within a given revolution of the control member, said sensor array also being responsive to the second coding means to detect the position of the control member within the entire range of motion of the control member.

32. The apparatus of claim 31 wherein the first coding means comprises a code disc that codes the angular position of the control member according to the position of a light signal within a linear range of movement.

33. The apparatus of claim 32 wherein the sensor array of the detection device is oriented transversely with respect to the linear range of movement of the light signal of said code disc.

34. The apparatus of claim 33 wherein the sensor array of the detection device comprises a plurality of converter elements that are arranged in a linear array.

35. The apparatus of claim 34 wherein the respective converter elements of the sensor array are oriented substantially orthogonally with respect to the code disc.

36. The apparatus of claim 31 wherein the detection device further includes an optical member that is positioned between the sensor array and the first coding means, said optical member receiving coding signals from the first coding means and also receiving signals from the second coding means, said optical member reflecting coding signals from the first coding means and from the second coding means to the sensor array.

37. The apparatus of claim 36 wherein the sensor array comprises a plurality of converter elements that are arranged in a linear array and wherein each of said converter elements has a photo-sensitive surface.

38. The apparatus of claim 37 wherein the optical member reflects coding signals from the first coding means and from the second coding means toward the photo-sensitive surface of the converter elements of the linear array.

39. The apparatus of claim 31 wherein the second coding means comprises an arm that has a claw at one end thereof, said claw engaging the pivot lever of the output gear, said arm being pivotally mounted adjacent to the first rotor of the first sensor unit and the detection device.

* * * * *